United States Patent [19]

Steinberger et al.

[11] Patent Number: 5,219,922
[45] Date of Patent: Jun. 15, 1993

[54] SILICONE ELASTOMERS HAVING REDUCED COMPRESSION SET AND A PROCESS FOR THEIR PRODUCTION

[75] Inventors: Helmut Steinberger; Klaus-Dieter Pesch; Thomas Naumann, all of Leverkusen, Fed. Rep. of Germany

[73] Assignee: Bayer Aktiengesellschaft, Leverkusen, Fed. Rep. of Germany

[21] Appl. No.: 690,415

[22] Filed: Apr. 24, 1991

[30] Foreign Application Priority Data

May 4, 1990 [DE] Fed. Rep. of Germany ....... 4014310

[51] Int. Cl.⁵ .......................... C08K 3/10; C08K 3/30
[52] U.S. Cl. ..................... 524/785; 523/210; 523/213; 524/780; 524/783; 524/789; 524/858; 524/588; 524/402; 524/413; 524/420; 524/434; 524/435; 524/493
[58] Field of Search ............... 523/210, 213; 524/780, 524/783, 785, 789, 858, 588, 402, 413, 420, 434, 435, 493

[56] References Cited

U.S. PATENT DOCUMENTS

| | | | |
|---|---|---|---|
| 3,137,670 | 6/1964 | Maneri | 524/413 |
| 3,518,222 | 6/1970 | Ostrowski | 524/420 |
| 3,810,925 | 5/1974 | Viksne | 524/435 |
| 4,640,956 | 2/1987 | Toub et al. | 524/779 |
| 4,748,166 | 5/1988 | Gautier et al. | 524/435 |
| 4,946,893 | 8/1990 | Saito et al. | 524/785 |

FOREIGN PATENT DOCUMENTS

2325333 5/1973 Fed. Rep. of Germany .
2185749 7/1987 United Kingdom .

Primary Examiner—Melvyn I. Marquis
Assistant Examiner—Karen A. Dean
Attorney, Agent, or Firm—Sprung Horn Kramer & Woods

[57] ABSTRACT

The present invention relates to silicone elastomers based on platinum-catalyzed, hot-curing organopolysiloxane compositions which are characterized by particularly low compression set after crosslinking and to a process for the production of these elastomers.

5 Claims, No Drawings

SILICONE ELASTOMERS HAVING REDUCED COMPRESSION SET AND A PROCESS FOR THEIR PRODUCTION

BACKGROUND OF THE INVENTION

This invention relates to silicone elastomers based on platinum-catalyzed, hot-curing organopolysiloxane compositions which are characterized by particularly low compression set after crosslinking and to a process for the production of these elastomers.

In the test according to DIN 53 517, conventional organopolysiloxane elastomers can have a compression set of up to 95% when they are exposed for a while to temperatures above 150° C. However, in many applications, for example as seals, organopolysiloxane elastomers have to be able to withstand temperatures of more than 300° C. for prolonged periods without any excessive increase in their compression set.

For compounds based on diorganopolysiloxanes which can be crosslinked to elastomers by organic peroxidic compounds, methods of obtaining particularly low compression set values without heating are described in the prior art, cf. for example U.S. Pat. Ser. Nos. 3,261,801, 3,468,838 and 3,865,778 which mention such additives as barium peroxide, barium oxide or magnesium oxide for obtaining a particularly low compression set after vulcanization.

DE 2 911 352 describes the use of at least one basic inorganic solid hydrophobicized by treatment with organosilicon compounds for the production of elastomers which show a particularly low compression set after heating in the presence of air.

Another process for the production of organopolysiloxane compounds having a reduced compression set which can be cured to elastomers is described in EP 0 010 708. In this case, additions of 0.1 to 8% by weight, based on the mixture as a whole, of polycarbodiimide in the form of polycarbodiimide/polysiloxane copolymers improve the compression set.

As already mentioned, the known processes described above for improving the compression set of polysiloxane elastomers are applicable to any compounds which can be crosslinked to elastomers by organic peroxidic compounds. In recent years, however, organopolysiloxane compounds crosslinked by a hydrosilylation reaction of vinyl-containing siloxanes have been acquiring increasing interest. It is known that this hydrosilylation reaction is catalytically accelerated by a number of platinum compounds.

Like peroxide-crosslinked systems, platinum-catalyzed addition systems of this type can have compression sets of up to 75%. It would be desirable to increase the compression set for a number of industrial applications of these addition-crosslinked elastomers.

However, the processes recommended for peroxide-crosslinked organopolysiloxane compounds to reduce the compression set of their vulcanizates fail when applied to platinum-catalyzed addition systems.

DESCRIPTION OF THE PREFERRED EMBODIMENTS

It has now surprisingly been found that platinum-catalyzed addition systems can be crosslinked to elastomers having particularly low compression sets providing certain transition metal chalcogenides have been added to the organopolysiloxane compound.

Accordingly, the present invention relates to organopolysiloxane compositions which, after crosslinking, can be vulcanized to elastomers having a particularly low compression set and which essentially contain the following constituents:

a) 100 parts by weight of a vinyl-containing basic polymer corresponding to the following formula

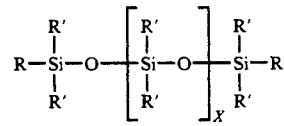

in which R and R' are alkyl groups containing 1 to 8 carbon atoms, aryl groups, vinyl groups and fluoro-alkyl groups containing 3 to 8 carbon atoms, so that the polymer contains 0.0002 to 3% by weight vinyl groups, and X is varied so the viscosity of the polymer extends from 0.1 to 1,000 Pa.s (from 100 to 1,000,000 cp) at 25° C., b) 0 to 10 parts by weight of silanol-containing silicone compounds having a viscosity in the range from 0.010 to 1 Pa.s (10 to 1,000 cp) at 25° C., the organic group being selected from alkyl groups containing 1 to 8 carbon atoms, vinyl groups, aryl groups, fluoroalkyl groups containing 3 to 8 carbon atoms so that the polymer has a silanol content of 2 to 10%, c) 0 to 200 parts by weight of a filler, d) 1 to 50 parts by weight of a polysiloxane corresponding to the following formula

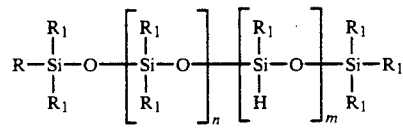

in which $R_1$ is an alkyl group containing 1 to 8 carbon atoms or aryl and fluoroalkyl groups containing 3 to 8 carbon atoms, $m > 3$ and $n + m$ is varied so that the polymer has a viscosity in the range from 0.005 to 0.1 Pa.s at 25° C. and e) 1 to 250 ppm of a platinum catalyst and, optionally, inhibitors or other auxiliaries and f) 0.01 to 8 parts by weight of a transition metal chalcogenide in finely divided form, preferably sulfides and/or selenides of the elements iron, cobalt, nickel, cadmium, zinc, molybdenum and tungsten, a quantity of 0.05 to 4 parts by weight being preferred.

The present invention also relates to a process for the production of compositions according to the invention which is characterized in that the constituents mentioned above are reacted.

Suitable starting components a) and b) for the process according to the invention are compounds known per se of the type described, for example, by W. Noll in "Chemie und Technologie der Silicone", 2nd Edition, 1968, page 212.

Suitable fillers for the process according to the invention are, for example, pyrogenic or precipitated, finely divided silicas having a BET surface of 50 to 500 m²/g. Fillers such as these may be surface-modified, for example with organosilicon compounds. The modification may even be made during incorporation in the polymer by addition of, for example, hexamethyl disilazane or 1,3-divinyl-1,1,3,3-tetrameter disilazane with addition of water.

Such substances as, for example, diatomaceous earths, finely divided silica flours, amorphous silicas or carbon blacks may also be used as fillers.

The platinum catalysts are the catalysts typically used for the addition-crosslinking systems, more particularly for example—Pt(O) complexes containing vinyl siloxanes as ligands.

According to the invention, inhibitors may have to be used. Suitable inhibitors are acetylenic alcohols such as, for example, 2-methyl-3-butyn-2-ol, ethynyl cyclohexanol, tetramethyl tetravinyl cyclotetrasiloxane or tetramethyl divinyl disiloxane.

The transition metal chalcogenides according to the invention are commercially available products which are added in finely divided form to the organopolysiloxane compound consisting of a) to e) before crosslinking.

The organopolysiloxane compounds modified in accordance with the invention are suitable for the production of molded articles of any kind and, more particularly, for articles for which a particularly low compression set is particularly important, such as for example rollers, seals and O-rings.

A process for the production of articles consisting of a thermoplastic material and an elastomeric material is also acquiring increasing interest.

Hybrid articles such as these are normally obtained by molding the thermoplastic and the elastomer together (co-molding). The otherwise usual process step of post-curing of the article is not applied in this case on account of the high temperatures required because the thermoplastic component of the article would be in danger of deforming or melting.

For articles such as these, therefore, it is important that a low compression set be reached immediately after vulcanization (without post curing).

The invention is illustrated by the following Examples.

EXAMPLES

Example 1

In a kneader, 47 parts by weight vinyl-terminated polydimethyl siloxane having a viscosity of 10 Pa.s are polydimethyl siloxane having a viscosity of 10 Pa.s are mixed with 4 parts by weight hexamethyl disilazane, 0.3 part by weight tetramethyl divinyl disilazane and 3 parts by weight water and the resulting mixture is subsequently kneaded with 18 parts by weight pyrogenic silica having a specific BET surface of 300 m²/g to form a homogeneous mass (the filler being incorporated in accordance with DE-OS 2 535 334). The mixture is first heated to 130° C. and stirred for 1.5 hours with the kneader closed and is then freed from water and excess silazane in vacuo at 160° C. After cooling of the compound, the mixture is mixed and vulcanized with the following additives:

1.53 g of a trimethylsilyl-terminated polyorganosiloxane crosslinking agent containing on average 5 methyl hydrogen siloxane units and 3 dimethyl siloxane units per molecule, 0.15 g of a platinum catalyst in the form of a complex of chloroplatinic acid with symmetrical divinyl tetramethyl disiloxane and containing 0.65% platinum and approximately 0.02 g 3,5-dimethyl-1-hexyn-3-ol as inhibitor were added to 90 g of the above basic silicone composition. The curable elastomeric silicone composition obtained was then pressed to sheets and aged for 10 minutes at 175° C. (A stage).

Test specimens for the DIN tests indicated (see Table) were cut out from the cured sheets and tested.

Some of the test specimens are aged in hot air for 4 hours at 200° C. after vulcanization. They are then subjected to the DIN tests mentioned above (B stage).

EXAMPLE 2

In a kneader, 47 parts by weight vinyl-terminated polydimethylsiloxane, 4 parts by weight hexamethyl disilazane, 0.3 part by weight tetramethyl divinyl disilazane, 3 parts by weight water and 18 parts by weight pyrogenic silica were mixed as in Example 1 and the compound obtained was vulcanized as follows:

90 g of the compound are carefully mixed with 1.53 g of a trimethylsilyl-terminated polyorganosiloxane cross-linking agent according to Example 1, 0.15 g platinum catalyst and 0.02 g 3,5-dimethyl-1-hexyn-3-ol and 1 g finely ground iron(II) sulfide having an average particle size of 20 micrometers.

The curable silicone composition obtained is subsequently molded to sheets and cured for 10 minutes at 175° C.

Test specimens for the DIN tests indicated (see Table 1) are cut out from the cured sheets and tested.

As in Example 1, some of the test specimens are aged in hot air for 4 hours at 200° C. after vulcanization. They are then subjected to the DIN tests.

EXAMPLE 3

An elastomeric silicone composition is prepared as in Example 1 and homogenized with addition of 1.0 g finely ground tungsten(IV) sulfide. The prepared mixture is cured as described in Example 1 and the test specimens are correspondingly prepared.

EXAMPLE 4

An elastomeric silicone composition is prepared as in Example 1 and is homogeneously mixed with addition of 1.0 g finely ground cadmium sulfide. The mixture thus prepared is cured as in Example 1 and the test specimens are correspondingly prepared.

EXAMPLE 5

An elastomeric silicone composition is prepared as in Example 1 and is homogeneously mixed with addition of 1.0 g finely ground cadmium selenide. The mixture thus prepared is cured as in Example 1 and the test specimens are correspondingly prepared.

EXAMPLE 6

An elastomeric silicone composition is prepared as in Example 1 and is homogeneously mixed with addition of 0.02 g finely ground iron(II) selenide.

The mixture thus prepared is cured as described in Example 1 and the test specimens are correspondingly prepared.

EXAMPLE 7

An elastomeric silicone composition is prepared as in Example 1 and is homogeneously mixed with addition of 0.5 g finely ground tungsten (IV) sulfide. The mixture thus prepared is cured as described in Example 1 and the test specimens are correspondingly prepared.

It is understood that the specification and examples are illustrative but not limitative of the present invention and that other embodiments within the spirit and scope of the invention will suggest themselves to those skilled in the art.

TABLE 1

|  | Example 1 | Example 2 (FeS) 1.07% | Example 3 (WS2) 1.07% | Example 4 (CdS) 1.07% | Example 5 (CdSe) 1.07% | Example 6 (FeSe) 0.02% | Example 7 (WS2) 0.54% |
| --- | --- | --- | --- | --- | --- | --- | --- |
| A stage 10'/175° C. |  |  |  |  |  |  |  |
| Hardness (Shore A) (DIN 53 505) | 47 | 47 | 45 | 47 | 48 | 41 | 47 |
| Elongation at break (%) (DIN 53 504) | 800 | 760 | 800 | 780 | 760 | 750 | 760 |
| Tensile strength (MPa) (DIN 53 504) | 8.3 | 8.1 | 8.2 | 8.2 | 8.3 | 5.5 | 8.2 |
| Compression set (%) (DIN 53 517, 22 h/175° C.) | 52 | 47 | 12 | 25 | 11 | 29 | 15 |
| B-stage 10'/175° C. + 4 h/200° C. HA |  |  |  |  |  |  |  |
| Hardness (Shore A) (DIN 53 505) | 51 | 50 | 49 | 50 | 50 | 43 | 50 |
| Elongation at break (%) (DIN 53 504) | 625 | 600 | 720 | 620 | 610 | 660 | 660 |
| Tensile strength (MPa) (DIN 53 504) | 8.9 | 8.1 | 9.4 | 8.6 | 8.5 | 7.4 | 8.5 |
| Compression set (%) (DIN 53 517, 22 h/175° C.) | 12 | 7 | 8 | 20 | 6 | 24 | 9 |

What is claimed is:

1. An organopolysiloxane-based composition which has a reduced compression set and can be cured to elastomers, comprising:

a) 100 parts by weight of a vinyl-containing polymer corresponding to the following formula

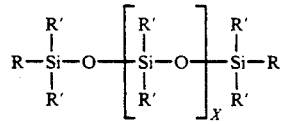

in which R and R' are alkyl groups containing 1 to 8 carbon atoms, aryl groups, vinyl groups and fluoroalkyl groups containing 3 to 8 carbon atoms, so that the polymer contains 0.0002 to 3% by weight vinyl groups, and X is varied so the viscosity of the polymer extends from 0.1 to 1,000 Pa.s (from 100 to 1,000,000 cp at 25° C., b) 0 to 10 parts by weight of silanol-containing silicone compounds having a viscosity in the range from 0.010 to 1 Pa.s (10 to 1,000 cp) at 25° C., the organic group being selected from alkyl groups containing 1 to 8 carbon atoms, vinyl groups, aryl groups, fluoroalkyl groups containing 3 to 8 carbon atoms so that the polymer has a silanol constant of 2 to 10%, c) 0 to 200 parts by weight of a filler, d) 1 to 50 parts by weight of a polysiloxane corresponding to the following formula $$R-\underset{\underset{R_1}{|}}{\overset{\overset{R_1}{|}}{Si}}-O-\left[\underset{\underset{R_1}{|}}{\overset{\overset{R_1}{|}}{Si}}-O\right]_n-\left[\underset{\underset{H}{|}}{\overset{\overset{R_1}{|}}{Si}}-O\right]_m-\underset{\underset{R_1}{|}}{\overset{\overset{R_1}{|}}{Si}}-R_1$$

in which $R_1$ is an alkyl group containing 1 to 8 carbon atoms or aryl and fluoroalkyl groups containing 3 to 8 carbon atoms, R is defined in a), m > 3 and n + m is varied so that the polymer has a viscosity in their range from 0.005 to 0.1 Pa.s at 25 ° C. and e) 1 to 250 ppm of a platinum catalyst and f) 0.01 to 8 parts by weight of transition metal sulfides and/or selenides.

2. A composition according to claim 1, wherein the sulfides and selenides are selected from the group consisting of sulfides and selenides of the elements iron, cobalt, nickel, cadmium, zinc, molybdenum and tungsten.

3. A composition according to claim 1, wherein the transitional metal sulfides and/or selenides have an average particle size of 20 micrometers.

4. A process of the production of a composition having a reduced compression set according to claim 1, wherein components a) to e) are reacted.

5. A composition according to claim 1 wherein component f) is present in an amount from about 0.05 to 4 parts by weight.

* * * * *

UNITED STATES PATENT AND TRADEMARK OFFICE
CERTIFICATE OF CORRECTION

PATENT NO. : 5,219,922
DATED : June 15, 1993
INVENTOR(S) : Steinberger et al.

It is certified that error appears in the above-identified patent and that said Letters Patent is hereby corrected as shown below:

Col. 5, line 58   Delete " constant " and substitute -- content --

Col. 6, line 42   Delete " their " and substitute -- the --

Signed and Sealed this

Twenty-seventh Day of September, 1994

Attest:

BRUCE LEHMAN

Attesting Officer      Commissioner of Patents and Trademarks